United States Patent
Lee

(10) Patent No.: US 9,465,223 B2
(45) Date of Patent: Oct. 11, 2016

(54) BARRIER SUBSTRATE, BARRIER PANEL HAVING THE SAME AND DISPLAY APPARATUS HAVING THE SAME

(75) Inventor: Dong-Yoon Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 1059 days.

(21) Appl. No.: 13/607,435

(22) Filed: Sep. 7, 2012

(65) Prior Publication Data

US 2013/0229327 A1  Sep. 5, 2013

(30) Foreign Application Priority Data

Mar. 5, 2012  (KR) .......................... 10-2012-0022216

(51) Int. Cl.
*G02F 1/1335* (2006.01)
*G02B 27/22* (2006.01)
*H04N 13/04* (2006.01)

(52) U.S. Cl.
CPC ...... *G02B 27/2214* (2013.01); *H04N 13/0409* (2013.01); *G02F 2201/124* (2013.01)

(58) Field of Classification Search
CPC ................... G02B 27/2214; G06F 2201/124
See application file for complete search history.

(56) References Cited

U.S. PATENT DOCUMENTS

| 2006/0146208 A1* | 7/2006 | Kim ................... G02B 27/2214 |
| | | 349/15 |
| 2009/0153653 A1 | 6/2009 | Lee et al. |
| 2010/0079695 A1* | 4/2010 | Um ................... G02F 1/136213 |
| | | 349/43 |

FOREIGN PATENT DOCUMENTS

| KR | 1020100048819 A | 5/2010 |
| KR | 1020100075301 A | 7/2010 |
| KR | 1020100075302 A | 7/2010 |

* cited by examiner

*Primary Examiner* — Wen-Ying P Chen
(74) *Attorney, Agent, or Firm* — Innovation Counsel LLP

(57) ABSTRACT

A crosstalk-reducing barrier panel is provided atop of a 3D-capable image panel where the image panel displays 3D imagery by alternatingly projecting left-eye imagery and right-eye imagery and where crosstalk may develop between leaked portions of the left and right-eye light rays produced by the image panel. The barrier panel includes a base substrate, odd-numbered barrier electrodes, even-numbered barrier electrodes, first through fourth signal delivering lines, and one or more signal generators that generate a first signal and a second signal. The first signal is respectively delivered to opposed ends of the odd-numbered barrier electrodes by way of a respective first "short-path" delivery route and also by way of a respective first "long-path" delivery route. The second signal is respectively delivered to opposed ends of the even-numbered barrier electrodes by way of a respective second "short-path" delivery route and also by way of a respective second "long-path" delivery route.

18 Claims, 6 Drawing Sheets

OBA EBA

OBA EBA

BARRIER SUBSTRATE, BARRIER PANEL HAVING THE SAME AND DISPLAY APPARATUS HAVING THE SAME

This application claims priority under 35 U.S.C. §119 to Korean Patent Application No. 10-2012-0022216, filed on Mar. 5, 2012 and all the benefits accruing therefrom under 35 U.S.C. §119, where the contents of said application are incorporated herein by reference in their entirety.

BACKGROUND

1. Field of Disclosure

The present disclosure of invention relates to 3D displays. More specifically, it relates to a barrier substrate usable in a 3D display, to a display panel having the barrier substrate and to a 3D display apparatus having the barrier substrate. Yet more particularly, the present disclosure of invention relates to an auto-stereoscopic display assisting barrier substrate usable in a 3D auto-stereoscopic display apparatus.

2. Description of Related Technology

Older and conventional display apparatuses were limited to displaying only a 2-dimensional planar image. Recently however, demand has increased for displays capable of producing 3-dimensional stereoscopic images for use in various fields such as computerized gaming, cinema, etc. The 3-dimensional stereoscopic image displaying apparatus displays a stereoscopic image by taking advantage of a binocular parallax phenomenon of the human visual system. One type of 3D image displaying system that uses the binocular parallax phenomenon is referred to as the stereoscopic type and another is referred to as the autostereoscopic type. In the stereoscopic type of 3D image displaying system, light rays corresponding to left and right eye perceptions are respectively directed to the left and right eyes of the human viewer. In order to direct the left and right eye light rays to the correct eye respectively without left-to-right crosstalk, a barrier type of light rays shuttering system is sometimes used. Additionally, a lenticular type, or a liquid crystal refracting lens type, etc. may be used for creating the stereoscopic effect. It is to be understood that use of the barrier type of light rays shuttering systems does not preclude simultaneous use of lenticular lens or dynamic shutter type eye glasses, etc. The barrier type of light rays shutter may be used to reduce undesired cross-talk between left and right eye images.

In display apparatuses of the barrier type, a so-called, barrier panel is disposed on top of a conventional display panel used for displaying a 2-dimensional planar image where the barrier panel can be switched from showing a 2-dimensional planar image into showing a 3-dimensional stereoscopic image where the purpose of the barrier panel is to reduce cross-talk between left and right eye images. However, as shall be detailed below, barrier panels can suffer in disparity of shuttering effect they produce in different sections of the display area (DA) of the image panel.

A barrier panel in accordance with the present disclosure may include pluralities of odd-numbered and even-numbered barrier electrodes and plural signal delivering lines (The signal delivering lines are also referred to herein more simply as "signal lines".) The odd and even-numbered barrier electrodes are extended in a first direction (e.g., a columnar direction of a corresponding display area DA), and the plural signal delivering lines are extended in a second direction (e.g., a row direction of a peripheral area PA), the second direction is different from the first direction. The plural signal delivering lines respectively deliver the corresponding first and second signals to the odd and even-numbered barrier electrodes for thereby controlling operations of the barrier panel (e.g., selectively blocking out (acting as a crosstalk-reducing "barrier" for) left-eye light rays or right-eye light rays).

Since a trend in the field for display apparatuses for display of stereoscopic images is that of providing larger and larger display areas (DA's), the respective lengths of the plural signal delivering lines and the lengths of the odd and even-numbered barrier electrodes become longer too. Also, since a size and a thickness of bezel area of the display apparatus for display of stereoscopic images tends to be decreased, a corresponding width and a thickness of the plural signal lines tends to become decreased. Also, since a resolution of the display apparatus for display of stereoscopic images tends to increase, the corresponding sizes (e.g., widths and thicknesses) of the odd and even-numbered barrier electrodes tend to become decreased. Therefore, respective resistances of the plural signal lines, and respective resistances of the odd and even-numbered barrier electrodes tend to increase and this increases an RC time delay problem wherein it becomes more difficult to uniformly drive all parts of the odd and even-numbered barrier electrodes.

One of the undesired effects of increased RC time constants is that first voltage signal levels at opposed ends of a long signal delivering line can be different from each other and second voltage signal levels at opposed ends of a long other signal line can be similarly different each other. Also, respective voltage signal levels at the opposed ends of long odd-numbered barrier electrodes can be different from each other and respective voltage signal levels at the opposed ends of long even-numbered barrier electrode can be different from each other. Therefore, the cross-talk blocking action (barrier providing action) of a barrier panel may not be uniform over the entire display area DA and cross talk in different sub-sections of the display area DA of the display apparatus may be undesirably intensified as compared to other sub-sections of the display area. Such non-uniformity in blockage of cross talk can create undesired artifacts in the produced 3D imagery.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

Exemplary embodiments in accordance with the present disclosure of invention provide a barrier substrate structured to decrease non-uniformity of blockage of left and right eye crosstalk as perceived for different subsections (e.g., upper versus lower and left versus right sub-areas) of the display area DA of a display apparatus used for displaying stereoscopic images.

Exemplary embodiments of the present disclosure provide a barrier panel including the barrier substrate.

Exemplary embodiments of the present disclosure also provide a display apparatus for display a stereoscopic image including the barrier substrate.

In an exemplary barrier panel according to the present disclosure, a barrier substrate includes a base substrate, odd-numbered barrier electrodes interdigitated with even-numbered barrier electrodes, a first signal delivering line, a second delivering signal line, a third signal delivering line, and a fourth signal delivering line. (For simplicity sake, the first through fourth signal delivering lines are also respectively referred to herein as first through fourth signal lines.) The odd-numbered barrier electrodes and even-numbered barrier electrodes are extended in a first direction on the base substrate and arranged adjacent to one another along a second direction; the second direction is different from the first direction. The first signal line is electrically connected to first ends of the odd-numbered barrier electrodes and delivers to those first ends, and along the second direction, a first signal. The second signal line is electrically connected to opposed second ends of the odd-numbered barrier electrodes and delivers to those second ends, and along a third direction, the first signal, where the third direction is opposite to the second direction. The third signal line is electrically connected to third ends of the even-numbered barrier electrodes and delivers to those third ends, and along the second direction, a second signal, the second signal being different from the first signal. The fourth signal line is electrically connected to opposed fourth ends of the even-numbered barrier electrodes and delivers to those fourth ends, and along the third direction, the second signal.

In the exemplary embodiment, the odd-numbered barrier electrodes may be overlapped with the first, second and fourth signal lines but not with the third signal delivering lines; and the even-numbered barrier electrodes may be overlapped with the second, third and fourth signal lines but not with the first signal delivering lines.

In the exemplary embodiment, the odd-numbered barrier electrodes may be electrically connected with the first and second signal line by a plurality of a first contact holes and the even-numbered barrier electrodes may be electrically connected with the third and fourth signal line by a plurality of a second contact holes.

In the exemplary embodiment, the first signal line may include a first end, a second end. The first end is adjacent to a first odd-numbered barrier electrode of the odd-numbered barrier electrodes. The second end is adjacent to an n-th odd-numbered barrier electrode of the odd-numbered barrier electrodes. The second signal line may include a first sub-electrode, a second sub-electrode, and a third sub-electrode. The first sub-electrode includes a third end adjacent to a first odd-numbered barrier electrode of the barrier electrodes and a fourth end adjacent to an n-th odd-numbered barrier electrode of the odd-numbered barrier electrodes. The second sub-electrode is paralleled with the first sub-electrode and including a fifth end facing with the third end and sixth end facing with the fourth end. The third sub-electrode connecting the third end and the fifth end.

In the exemplary embodiment, the third signal line may include a seventh end and an eighth end. The seventh end is adjacent to a first even-numbered barrier electrode of the even-numbered barrier electrodes. The eighth end is adjacent to an n-th even-numbered barrier electrode of the odd-numbered barrier electrodes. The fourth signal line may include a fourth sub-electrode, a fifth sub-electrode and a sixth sub-electrode. The fourth sub-electrode includes a ninth end adjacent to a first odd-numbered barrier electrode of the barrier electrodes and a tenth end adjacent to an n-th odd-numbered barrier electrode of the odd-numbered barrier electrodes. The fifth sub-electrode is paralleled with the first sub-electrode and includes an eleventh end facing with the ninth end and twelfth end facing with the tenth end. The sixth sub-electrode connects the ninth end and the twelfth end.

In the exemplary embodiment, the barrier substrate may include a barrier driving part. The barrier driving part may provide the first signal by connecting to the second end and the sixth end and provide the second signal by connecting to the ninth end and the twelfth end.

In the exemplary embodiment, the barrier substrate may include a sealing member. The sealing member may be overlapped with the second, third, fifth and sixth sub-electrodes.

In the exemplary embodiment, the first signal line may be disposed between the fourth sub-electrode and the fifth sub-electrode. The third signal line may be disposed between the first sub-electrode and the second sub-electrode.

In the exemplary embodiment, the first signal line may include the first end and the second end. The first end is adjacent to the first odd-numbered barrier electrode of the odd-numbered barrier electrodes. The second end is adjacent to the n-th odd-numbered barrier electrode of the odd-numbered barrier electrodes. The second signal line may include the third end and the fourth end. The third end is adjacent to the first odd-numbered barrier electrode of the barrier electrodes. The fourth end is adjacent to the n-th odd-numbered barrier electrode of the odd-numbered barrier electrodes. The third signal line may include the seventh end and the eighth end. The seventh end is adjacent to the first even-numbered barrier electrode of the even-numbered barrier electrodes. The eighth end is adjacent to the n-th even-numbered barrier electrode of the even-numbered barrier electrodes. The fourth signal line may include the ninth end and the tenth end. The ninth end is adjacent to the first odd-numbered barrier electrode of the barrier electrodes. The tenth end is adjacent to the n-th odd-numbered barrier electrode of the odd-numbered barrier electrodes.

In the exemplary embodiment, the barrier substrate may include a first barrier driving part and a spaced apart second barrier driving part. The first barrier driving part provides the first signal by connecting to the second end and provides the second signal by connecting to the eighth end. The second barrier driving part provides the first signal by connecting to the sixth end and provides the second signal by connecting to the twelfth end.

In the exemplary embodiment, the odd and even-numbered barrier electrode may include transparent conductive oxide. The first, second, third and fourth signal line may include copper or aluminum.

In an exemplary barrier panel according to the present invention, a barrier panel includes a first barrier substrate, a second barrier substrate and a so-called, second liquid crystal layer interposed between the first and second barrier substrates. The first barrier substrate includes a base substrate, odd-numbered barrier electrodes and even-numbered barrier electrodes, a first signal line, a second signal line, a third signal line and a fourth signal line. The odd-numbered barrier electrodes and even-numbered barrier electrodes are extended to a first direction on the first base substrate and arranged in a second direction. The second direction is different from the first direction. The first signal line is electrically connected to one ends of the odd-numbered barrier electrodes and provides in a second direction with a first signal. The second signal line is electrically connected to another ends of the odd-numbered barrier electrodes and provides in a third direction with a first signal. The third direction is opposite direction to the second direction. The third signal line is electrically connected to one ends of the even-numbered barrier electrodes and provides in the second direction with a second signal. The second signal is different from the first signal. The fourth signal line is electrically connected to another ends of the even-numbered barrier electrodes and provides in the third direction with the second signal. The second barrier substrate faces the first barrier substrate and includes a base substrate and a common electrode disposed on a base substrate.

In the exemplary embodiment, the even-numbered barrier electrodes may be shifted to the first direction against the odd-numbered barrier electrodes.

In the exemplary embodiment, the odd-numbered barrier electrodes may be overlapped with the first, second and fourth signal line. The even-numbered barrier electrodes may be overlapped with the second, third and fourth signal line.

In the exemplary embodiment, the first barrier substrate may be a sealing member overlapped with the second, third, fifth and sixth sub-electrodes.

In the exemplary embodiment, the sealing member may have lower dielectric permittivity than a permittivity of the second liquid crystal layer.

In an exemplary display apparatus according to the present disclosure, a display apparatus includes a display panel and a barrier panel. The display panel displays an image. The barrier panel includes a first barrier substrate and a second barrier substrate. The first barrier substrate includes a first base substrate, odd-numbered barrier electrodes and even-numbered barrier electrodes, a first signal line, a second signal line, a third signal line and a fourth signal line. The first base substrate is disposed on the display panel. The odd-numbered barrier electrodes and even-numbered barrier electrodes are extended to a first direction on the first base substrate and arranged in a second direction. The second direction is different from the first direction. The first signal line is electrically connected to first ends of the odd-numbered barrier electrodes and provides in a second direction with a first signal. The second signal line is electrically connected to second ends of the odd-numbered barrier electrodes and provides in a third direction with a first signal. The third direction is opposite direction to the second direction. The third signal line is electrically connected to first ends of the even-numbered barrier electrodes and provides in the second direction with a second signal. The second signal is different from the first signal. The fourth signal line is electrically connected to second ends of the even-numbered barrier electrodes and provides in the third direction with the second signal. The second barrier substrate faces the first barrier substrate and includes a base substrate and a common electrode disposed on a base substrate.

In the barrier panel having the barrier substrate and/or a display apparatus having the barrier substrate, the first signal line connects to one end of odd-numbered barrier electrodes and the second signal line connects to another end of odd-numbered barrier electrodes so as to provide the first signal from opposite directions, so that a disparity in cross talk reduction between upper and lower of the odd-numbered barrier electrodes may be deceased.

Also, the third signal line connected to one end of even-numbered barrier electrodes and the fourth signal line connected to another end of even-numbered barrier electrodes are provide signal in opposite directions, so that a disparity in cross talk reduction between upper and lower of the odd-numbered barrier electrodes may be deceased.

Also, a sealing member is overlapped with the second signal line, so that RC delay of the second signal line may be decreased. A sealing member is overlapped with the fourth signal line, so that RC delay of the fourth signal line may be decreased.

Therefore, display quality of display apparatus for display a stereoscopic image is improved.

BRIEF DESCRIPTION OF THE DRAWINGS

The above and other features and advantages of the present disclosure of invention will become more apparent by describing in detailed exemplary embodiments thereof with reference to the accompanying drawings, in which.

DETAILED DESCRIPTION

Hereinafter, the present disclosure of invention will be explained in more detail with reference to the accompanying drawings.

Figure 1:
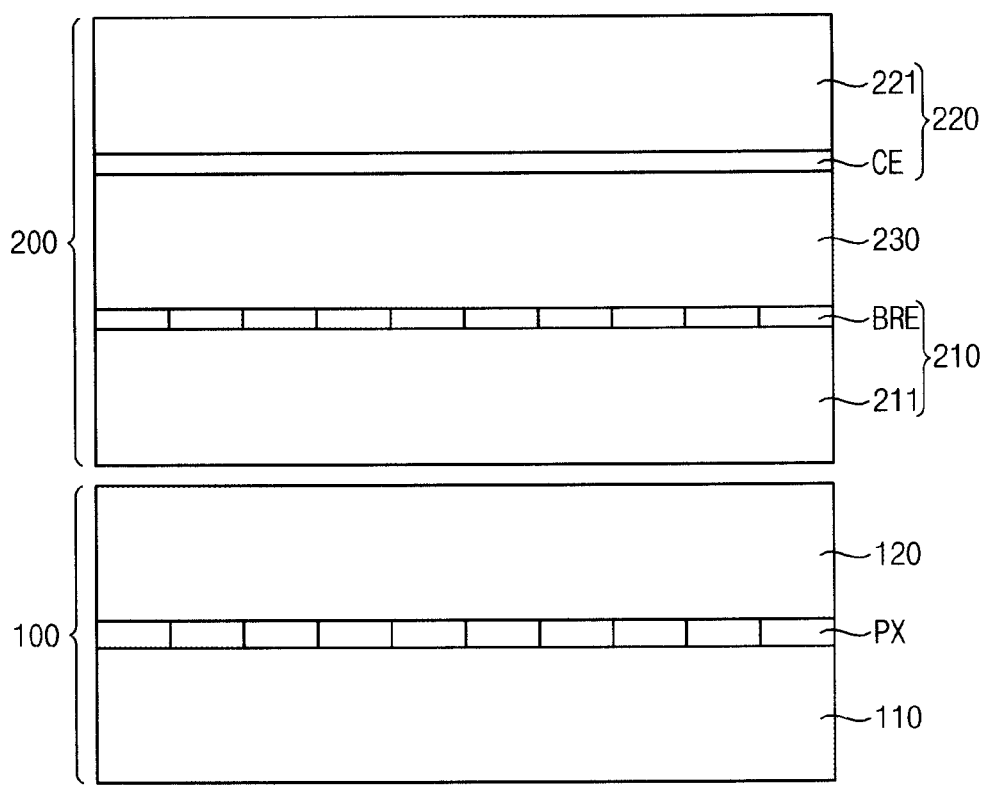
FIG. 1 is a cross-sectional view illustrating a display apparatus for a 3D display according to an exemplary embodiment.

FIG. 1 is a schematic cross-sectional view illustrating a display apparatus for a 3D display according to an exemplary embodiment of the present disclosure.

Figure 2:
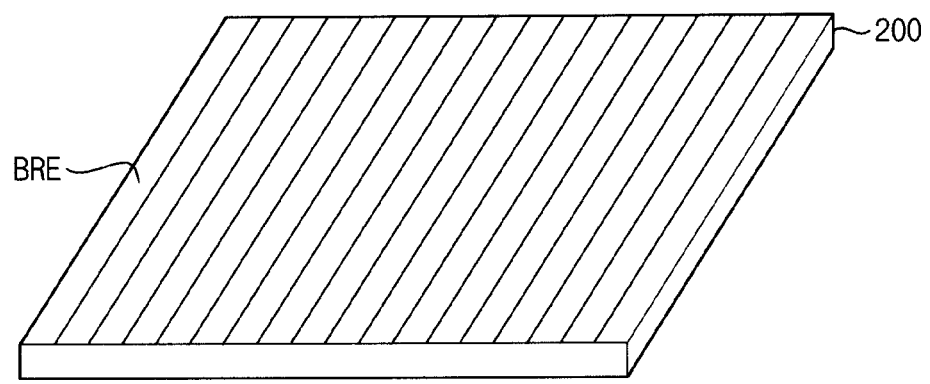
FIG. 2 is a perspective view illustrating a display apparatus for display of FIG. 1.
Figure 2:
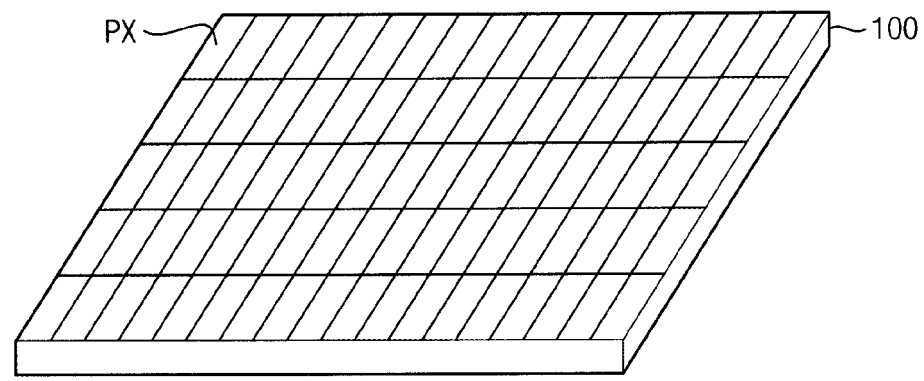
Figure 2:
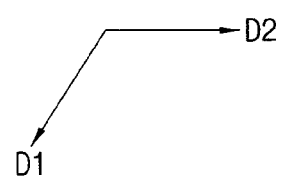

Referring to FIGS. 1 and 2, a display apparatus for display of stereoscopic 3D images includes an image display panel 100 and a crosstalk-reducing barrier panel 200.

The image display panel 100 may include a first substrate 110, a spaced apart second substrate 120 and a liquid crystal (LC) material layer interposed between the first and second substrates. The structure of the image display panel 100 is schematically represented as having a plurality of pixel portions or units PX defined by pixel unit elements opposingly disposed in one or the other of the first substrate 110 and the second substrate 120. Conventionally, in the case where the image display panel 100 is structured as a Liquid Crystal Display (LCD) imaging device, so-called, pixel-electrodes may be disposed in a matrix format on the upper major surface of the lower, first substrate 110 and opposed common electrode portions may be disposed in a matrix or other format on the lower and facing major surface of the upper second substrate 120. However, it is to be appreciated that other schemes are possible, for example where both of pixel-electrodes and common electrode portions are disposed along the upper major surface of the lower, first substrate 110. Although not shown, one or both of the first and second substrates 110 and 120 may incorporate light ray processing means such as polarizing plates, prismatic plates, diffusers and the like. Typically, a backlighting unit (not shown) provides backlighting illumination from under the first substrate 110. That light is once polarized by a polarizing means associated with the first substrate 110. Then the once polarized light rays are further polarized by action of differently oriented liquid crystal molecules in the interposed, first liquid crystal layer (denoted as PX) where each pixel unit PX may re-orient its respective light rays differently. The rudiments of a desired image are thus formed. The image display panel 100 need not be of the liquid crystal type. It could instead be structured as a matrix of individually addressable and driven organic light emitting diodes (OLEDs) or other individually controllable light rays emitters and/or light ray valving units.

Although not shown in detail, the individually controllable light rays emitters and/or light ray valving (e.g., shuttering) units may be disposed between unit selecting and controlling wires (or other conductive lines) that can be used to address the respective PX units and place them in desired light ray emitting and/or light ray valving (e.g., shuttering) modes where those modes can define the perceived luminances of the respective image pixels PX. The unit selecting and controlling wires (e.g., gate lines and data lines) may be respectively arranged as extending in a first direction and a different second direction. Although not shown, in one embodiment, each pixel unit PX may include a switching element (e.g., a TFT transistor), a pixel electrode (e.g., made of ITO or IZO), an opposed portion of a first common electrode and an interposed portion of a first liquid crystal layer. The switching elements (e.g., TFTs) may each be disposed on the first substrate 110 and electrically connected to a corresponding gate line and a corresponding data line. The pixel electrode is electrically connected to the switching element and charged to one potential state or another based on gate and data signals provided on the corresponding gate and data lines. The first common electrode may be disposed on the second substrate 120 to face the pixel electrodes. However, this scheme is one of a number of different possible ones. The liquid crystal layer is disposed between the pixel electrodes and the common electrode in this exemplary scheme. As mentioned, the individually controllable light rays emitters and/or light ray valving (e.g., shuttering) units of the image creating panel 100 may take other forms (e.g., OLEDs, electrophoretic, etc.).

The crosstalk-reducing barrier panel 200 is disposed on top of the image display panel 100. A function of the barrier panel 200 is to selectively block image light rays emanating from the image display panel 100 and belonging to one or the other of left eye image and a right image. Other means, for example lenticular lenses and/or polarizing plates embedded optical output layer 221 may be used to direct the non-blocked light rays toward perception by a user's left side or a user's right side. Alternatively or additionally, the user may wear dynamic or passive eye glasses that cooperate with the display apparatus for creating the perception of a 3D image.

By synchronizing the selective blocking (barrier-forming) actions of the barrier panel 200 with the left and right eye image creating actions of the image display panel 100 it is possible to create a perception of 3D images with reduced crosstalk between the perceived left and right eye images. More specifically, when the barrier panel 200 is selectively blocking some of the image light rays emanating from the image display panel 100, where the blocked light rays are eventually intended for projection to the user's right eye, the image display panel 100 is simultaneously operating to project already formed left-eye imagery to the user's left-eye. At the same time the blocked right eye imagery is being refreshed (re-rendered) by the image display panel 100. On the other hand, when the barrier panel 200 is selectively blocking some of the image light rays emanating from the image display panel 100 and eventually intended for projection to the user's left eye, the image display panel 100 is simultaneously operating to project already formed right-eye imagery to the user's right eye. At the same time the blocked left eye imagery is being refreshed (re-rendered) by the image display panel 100. In the illustrated embodiment, the crosstalk-reducing barrier panel 200 provides its selective image blocking actions by using a second liquid crystal layer 230 and so-called, barrier electrodes (BRE) for controlling orientations of liquid crystal molecules in the second liquid crystal layer 230 so they are in either a light rays blocking mode or a light rays pass-through mode.

More specifically, the barrier panel 200 includes a first barrier substrate 210, a second barrier substrate 220 and the second liquid crystal layer 230 interposed between them.

The first barrier substrate 210 includes a respective first base substrate 211 and a plurality of transparent barrier electrodes BRE's disposed on the first base substrate 211. The second barrier substrate 220 includes a transparent second common electrode CE facing the barrier electrodes BRE's.

Each barrier electrode BRE is longitudinally extended in the first direction D1 and the barrier electrodes BRE's are arranged adjacent to one another along the second direction D2.

Each barrier electrode BRE is corresponded to at least one portion of a corresponding column of pixels on the image display panel 100. For example, an odd-numbered first barrier electrode BRE(odd) may be placed so as to correspond to at least a portion of a first pixel column in the display area DA of the image display panel 100. A width of the first barrier electrode BRE(odd) may be substantially the same as a width of the corresponding first pixel column.

Further, although not shown, it is within the contemplation of the present disclosure that a left-eye image segment may occupy plural ones of immediately adjacent pixel columns, that a right eye image segment may occupy plural ones of immediately adjacent pixel columns, and that each the barrier electrode BRE may be sized to correspond accordingly; for example by having a width that matches the combined width of a first, second and third pixel column. In other words, a width of the barrier electrode BRE may be substantially the same as a total width of the first, second and third pixel column in such an example.

When the width of the barrier electrode BRE is increased, its electrical resistance decreases, thus helping to reduce the problem of large RC delay constants. Also, the number adjacent view points representing a left-eye part or a right-eye part of a 3-dimensional stereoscopic image may be increased.

Next, the structure of the first barrier substrate 210 of the barrier panel 200 in accordance with the present disclosure will be explained in more detail.

Figure 3:
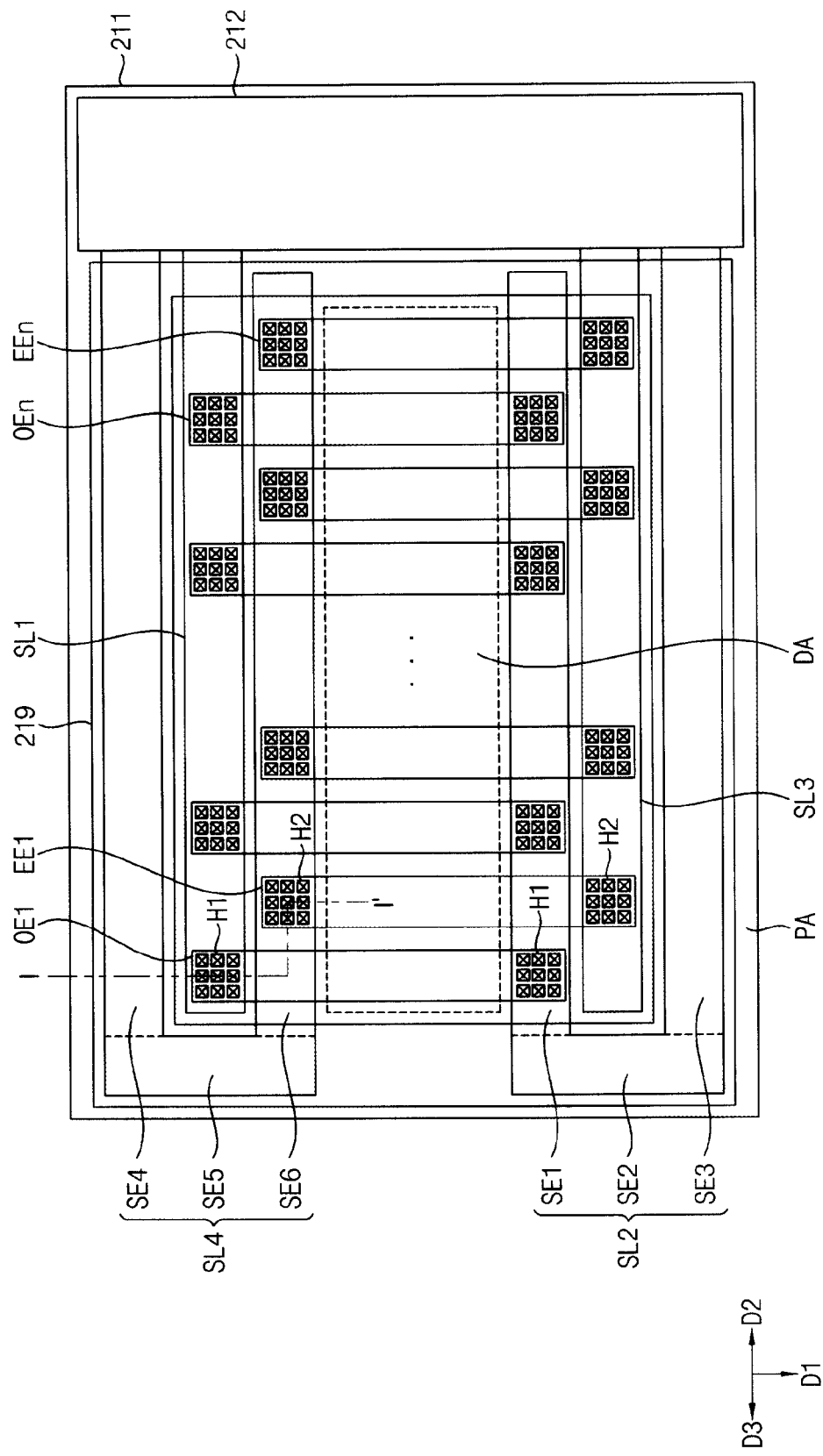
FIG. 3 is a plan view illustrating a barrier panel of FIG. 1.
Figure 4:
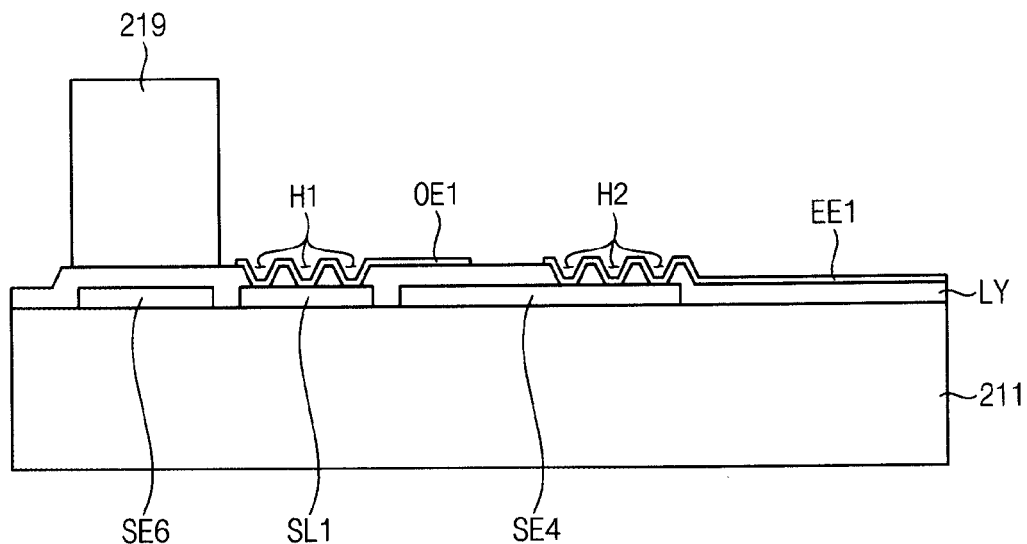
FIG. 4 is a cross-sectional view cutting along a line of I-I' of FIG. 3.

FIG. 3 is a top plan view illustrating a barrier panel of FIG. 1. FIG. 4 is a cross-sectional view cutting along a line of I-I' of FIG. 3.

Referring to FIGS. 3 and 4, the barrier substrate 210 includes: a first base substrate 211, a plurality of spaced apart odd-numbered barrier electrodes OEj, a plurality of spaced apart even-numbered barrier electrodes EEk interdigitated between the odd-numbered ones (where j=1, 2, . . . n and k=1, 2, . . . n), an insulation layer LY, a first signal nine SL1, a second signal nine SL2, a third signal nine SL3, a fourth signal nine SL4, and a barrier electrodes driving part 212. It is to be understood that at least portions of the odd and even-numbered barrier electrodes which extend through the display area DA of the display apparatus are transparent (e.g., made of ITO, IZO and/or another light-passing conductor). Also, the barrier substrate 210 and the insulation layer LY are substantially transparent.

In one embodiment, the barrier electrodes driving part 212 is directly and integrally formed on the first base substrate 211, for example using semiconductor-on-glass technology. Alternatively, the barrier electrodes driving part 212 may be separately formed from the first base substrate 211 and may be mounted on the first base substrate 211.

The even-numbered barrier electrodes EE are spaced apart from each of other and also slight spaced apart from the odd-numbered barrier electrodes OE. The odd-numbered barrier electrodes OE and the even-numbered barrier electrodes EE are disposed alternatingly as shown so that they substantially cover the display area DA of the device.

As mentioned, the odd-numbered barrier electrodes OE and the even-numbered barrier electrodes EE may include a transparent conductive oxide, TCO. For example, the odd-numbered barrier electrodes OE and the even-numbered barrier electrodes EE may include indium tin oxide (ITO), indium zinc oxide (ITO), etc.

The odd-numbered barrier electrodes OE extend in the first direction D1. For example, the odd-numbered barrier electrodes OE include a first to a n-th odd-numbered barrier electrodes OE1, . . . , OEn. The first to the n-th odd-numbered barrier electrodes OE1, . . . , OEn are disposed along the second direction D2 in a regularly spaced sequence.

The even-numbered barrier electrodes EE extend in the first direction D1. For example, the even-numbered barrier electrodes EE include a first to a n-th odd-numbered barrier electrodes EE1, . . . , EEn. The first to the n-th even-numbered barrier electrodes EE1, . . . , EEn are disposed in the second direction D2 in a regularly spaced sequence.

The even-numbered barrier electrodes EE are shifted to the first direction D1 relative to the odd-numbered barrier electrodes.

In FIG. 3, each of signal lines, SL2 and SL4 is a "long-path" signal line. By contrast, each of signal lines, SL1 and SL3 is a "short-path" signal line. The odd-numbered barrier electrodes OE are overlapped with and electrically connected to respective parts of the "short-path" first signal line SL1 and the "long-path" second signal line SL2. On the other hand, the same odd-numbered barrier electrodes OE overlap with but do not electrically connect to parts of the fourth signal line SL4. Instead the odd-numbered barrier electrodes OE are electrically insulated from the fourth signal line SL4. In similar fashion, the even-numbered barrier electrodes EE are overlapped with and electrically connected to respective parts of the "short-path" third signal line SL3 and the "long-path" fourth signal line SL4. On the other hand, the same even-numbered barrier electrodes EE overlap with but do not electrically connect to parts of the second signal line SL2. Instead, the even-numbered barrier electrodes EE are electrically insulated from the second signal line SL2.

The insulation layer LY is patterned and disposed on the first, second, third and fourth signal line SL1, SL2, SL3 and SL4 to provide electrical insulation where appropriate. The odd-numbered barrier electrodes OE and the even-numbered barrier electrodes EE are disposed on the insulation layer LY.

The first, second, third and fourth signal line SL1, SL2, SL3 and SL4 are disposed on the base substrate 211.

The first signal line SL1 (a "short-path" one) extends in the second direction D2 and is overlapped with first ends of the odd-numbered barrier electrodes OE. The first signal line SL1 is electrically connected with the first ends of the odd-numbered barrier electrodes OE by respective first contact holes denoted as H1.

The first signal line SL1 faces corresponding first adjacent ends of the odd-numbered barrier electrodes OE. The first signal line SL1 extends linearly from the barrier electrodes driving part 212 to a distal end of the first signal line SL1 where it connects to the first odd-numbered barrier electrode OE1. The driver proximate part of SL1 connects to the n-th odd-numbered barrier electrode OEn.

The barrier driving part 212 provides the proximate or second end of the first signal line SL1 with a respective first voltage signal. Therefore, the first voltage signal is provided to the odd-numbered barrier electrodes OE by way of the "short-path" first signal line SL1.

In one embodiment, the first voltage signal is swung between a predetermined maximum voltage level and a predetermined minimum voltage level. For example, the first voltage is swinged at a rate of 240 Hz. If the first voltage is maximal in a present frame, the first voltage may be minimal in the following frame. Thus the corresponding barrier areas of the second liquid crystal layer are alternatingly switched from a light passing to a light blocking mode on a frame by frame basis.

Ideally, the first voltage signal provided on the first end of the first odd-numbered barrier electrode OE1 would always be the same level as the first voltage signal provided on the first end of the n-th odd-numbered barrier electrode OEn. However, as the display apparatus is made larger, and as a result the resistance of the first signal line SL1 is increased, and as a result a substantial RC delay is imposed, the level of the first voltage signal provided on the first end of the first odd-numbered barrier electrode OE1 may have a lower voltage level than the first voltage signal provided on the first end of the n-th odd-numbered barrier electrode OEn. Thus, a non-uniform blockage of crosstalk as between the left and right sides of the display apparatus may be generated.

Also, due to a RC delay along the vertical lengths of the odd-numbered barrier electrodes OE, the first voltage signal provided on the first end of the odd-numbered barrier electrode OE may have a lower voltage level than the first voltage signal provided on the second (distal) ends. Thus, a non-uniform blockage of crosstalk as between upper and lower sub-sections of the display area DA of the display apparatus may be generated.

The "long-path" second signal line SL2 includes a first, second and third electrode segments or "sub-electrodes" SE1, SE2 and SE3.

The first and third sub-electrodes SE1 and SE3 of SL2 extend in the second direction D2 and are parallel.

The first sub-electrode SE1 includes a third end adjacent to the first odd-numbered barrier electrode OE1 and a fourth end adjacent to the n-th odd-numbered barrier electrode OEn. The third sub-electrode SE3 includes a fifth end facing the third end of the first sub-electrode SE1 and a sixth end facing the fourth end of the first sub-electrode SE1.

The second sub-electrode SE1 extends in the first direction D1 and connecting a third end of the first sub-electrode SE1 and a fifth end of the third sub-electrode SE3.

The first sub-electrode SE1 is overlapped with a second end of the odd-numbered barrier electrode OE. The first sub-electrode SE1 is electrically connected to the second end of the odd-numbered barrier electrode OE through the first contact holes H1.

The second signal line SL2 surround the third signal line SL3 and spaced apart from the third signal line SL3. The third signal line SL3 is disposed between the first sub-electrode SE1 and the third sub-electrode SE3.

The barrier driving part 212 is connected to a sixth end of the third sub-electrode SE3 and provides the sixth end of the third sub-electrode SE3 with the first voltage. Therefore, first voltage signal is provided the odd-numbered barrier electrodes OE through the third sub-electrode SE3, the second sub-electrode SE2 and the first sub-electrode SE3.

A first voltage signal level provided on a second end of the n-th odd-numbered barrier electrode OEn is ideally the same as a first voltage signal level provided at a second end of the first odd-numbered barrier electrode OE1. However, as the display apparatus is made larger, the resistance of the second line SL2 is increased, so that the first voltage signal level provided on the second end of the n-th odd-numbered barrier electrode OEn may have a lower voltage level than the first voltage signal provided on the second end of the first odd-numbered barrier electrode OE1. Thus, a crosstalk disparity between left and right of the display apparatus may be generated.

Also, due to a RC delay between the odd-numbered barrier electrodes OE and the second common electrode CE, the first voltage provided on the second end of the odd-numbered barrier electrode OE may have a lower voltage than the first voltage provided on the first end. Thus, a crosstalk disparity between upper and lower of the display apparatus may be generated.

According to a present exemplary embodiment, the first signal line SL1 provides the first end of the odd-numbered barrier electrodes OE with the first voltage signal in a third direction D3, a third direction D3 is opposite to the second direction D2, and the second signal line SL2 provides the second end of the odd-numbered barrier electrodes OE with the first voltage signal in the second direction D2, so that a voltage of the first voltage is compensated in between upper-lower and left-right of the display apparatus. Therefore, the first voltage may be substantially equally provided to the odd-numbered barrier electrodes OE. Stated otherwise, each barrier electrode is supplied by way of both of its ends, with a combination of drive signals provided by way of a "long-path" route and by way of a "short-path" route so that disparity as to drive signals supplied to the differently located barrier electrodes and different segments along the length of each barrier electrode is eliminated or reduced.

The third signal line SL3 extends in the second signal line SL2 and is overlapped with a first end of the even-numbered barrier electrodes EE. The third signal line SL3 is electrically connected to the first end of the even-numbered barrier electrode EE through the second contact holes H2.

The third signal line SL3 faces a seventh end adjacent to the first even-numbered barrier electrode EE1 and a seventh end of the third signal line SL3. The third signal line SL3 includes an eighth end adjacent to the n-th even-numbered barrier electrode EEn.

The barrier driving part 213 is connected to an eighth end of the third signal line SL3 and provides the eighth end of the third signal line SL3 with a second voltage. The second voltage signal is different from a first voltage signal. The second voltage signal is provided to the even-numbered barrier electrodes EE through the third signal line SL3.

The second voltage signal is swinged to predetermined maximum voltage and predetermined minimum voltage. For example, the first voltage is swinged at a rate of 240 Hz. If the second voltage is maximal in present frame, the first voltage may be minimal in following frame. The second voltage is swinged in opposite with the first voltage. Therefore, the second voltage is different from a first voltage in a same frame.

A second voltage signal level provided on a first end of the first even-numbered barrier electrode EE1 is ideally the same as a second voltage signal level provided a first end of the n-th even-numbered barrier electrode EEn. However, as the display apparatus is made larger, the resistance of the third line SL3 is increased, so that the second voltage signal level provided on the first end of the first even-numbered barrier electrode EE1 may have a lower voltage level than the second voltage signal provided on the first end of the n-th even-numbered barrier electrode EEn. Thus, a crosstalk disparity between left and right sides of the display apparatus may be generated.

Also, due to a RC delay between the even-numbered barrier electrodes EE and the second common electrode CE, the second voltage provided on the first end of the even-numbered barrier electrode EE may have a lower voltage than the second voltage provided on the second end. Thus, a crosstalk disparity between upper and lower of the display apparatus may be generated.

The fourth signal line SL4 includes a fourth, a fifth and a sixth sub-electrode SE4, SE5 and SE6. The fourth and the sixth sub-electrode SE4 and SE6 extend in the second direction D2 and are paralleled each other.

The fourth sub-electrode SE4 includes a ninth end adjacent to the first even-numbered barrier electrode EE1 and a tenth end adjacent to the n-th even-numbered barrier electrode EEn. The fifth sub-electrode SE5 includes an eleventh end faces the ninth end of the fourth sub-electrode SE4 and a twelfth end faces the tenth end of the fourth sub-electrode SE4.

The fifth sub-electrode SE5 extends in the first direction D1 and connects the ninth end of the fourth sub-electrode SE4 and eleventh end of the sixth sub-electrode SE6.

The fourth sub-electrode SE4 is overlapped with a second end of the even-numbered barrier electrodes EE. The fourth sub-electrode SE4 is electrically connected to the second end of the even-numbered barrier electrodes EE through the second contact hole H2.

The fourth signal line SL4 surround the firth signal line SL1 and spaced apart from the first signal line SL1. The first signal line SL1 is disposed between the fourth sub-electrode SE4 and the sixth sub-electrode SE6.

The barrier driving part 212 is connected to a twelfth end of the sixth sub-electrode SE6 and provides the twelfth end of the sixth sub-electrode SE6 with the second voltage. Therefore, the second voltage is provided the even-numbered barrier electrodes EE through the sixth sub-electrode SE6, the fifth sub-electrode SE5 and the fourth sub-electrode SE4.

A second voltage signal level provided on a second end of the n-th even-numbered barrier electrode EEn is ideally the same as a second voltage signal level provided a second end of the first even-numbered barrier electrode E1. However, as the display apparatus is made larger, the resistance of the fourth line SL4 is increased, so that the second voltage signal level provided on the second end of the n-th even-numbered barrier electrode EEn may have a lower voltage value than that of the first voltage signal provided on the second end of the first even-numbered barrier electrode EE1. Thus, a crosstalk disparity between left and right of the display apparatus may be generated.

Also, due to a RC delay between the even-numbered barrier electrodes EE and the second common electrode CE, the second voltage provided on the second end of the even-numbered barrier electrode EE may have a lower voltage than the second voltage provided on the first end. Thus, a crosstalk disparity between upper and lower of the display apparatus may be generated.

According to a present exemplary embodiment, the third signal line SL3 provides the first end of the even-numbered barrier electrodes EE with the second voltage signal in a third direction D3 and the fourth signal line SL4 provides the second end of the even-numbered barrier electrodes EE with the second voltage signal in the second direction D2, so that a voltage of the second voltage is compensated in between upper-lower and left-right of the display apparatus. Therefore, the second voltage may be substantially equally provided to the odd-numbered barrier electrodes OE. Stated otherwise, in one embodiment, each barrier electrode is supplied by way of both of its ends, with a combination of drive signals provided by way of a "long-path" route and by way of a "short-path" route so that disparity as to drive signal levels supplied to the differently located barrier electrodes and different segments along the length of each barrier electrode is eliminated or reduced.

The first, second, third and fourth signal lines SL1, SL2, SL3 and SL4 may include material same as a gate pattern material used for making the gate electrodes and gate lines, etc. of the display panel 100. The first, second, third and fourth signal lines SL1, SL2, SL3 and SL4 may include at least one metal layer.

Also, the first, second, third and fourth signal lines SL1, SL2, SL3 and SL4 may include material same as a data pattern material including in making a source electrode, a drain electrode, data line, etc. of the device.

For example, the first, second, third and fourth signal line SL1, SL2, SL3 and SL4 may include a single metal layer, the single metal layer may include cooper, aluminum, etc. Also, the first, second, third and fourth signal lines SL1, SL2, SL3 and SL4 may include a first and second metal layer, the first metal layer may include titanium, the second metal layer may include cooper, aluminum, etc.

The first barrier substrate 210 may include a sealing member 219. When the first barrier substrate 210 and the second barrier substrate 220 are combined, the sealing member 219 is disposed between the first barrier substrate 210 and the second barrier substrate 220 so as to contain liquid crystal material there between. The barrier electrodes BRE are disposed inside the liquid crystal containing area of the sealing member 219. The sealing member 219 is disposed on a periphery area (PA) surrounding a display area (DA) displaying a stereoscopic image. Therefore, the sealing member 219 encloses the second liquid crystal layer 230.

The sealing member 219 is overlapped with at least one of portions of a first and a second line P1 and P2 of the second signal line SL2 and at least one of portions of a fourth and fifth line P4 and P5 of the fourth signal line SL4.

The sealing member 219 includes material which has lower permittivity than the permittivity of the second liquid crystal layer 230. Therefore, a RC delay of the sealing member 219, the second and the fourth signal line SL2 and SL4 may be decreased.

According to the present exemplary embodiment, the first and second signal lines SL1 and SL2 in combination provide equally to the odd-numbered barrier electrodes OE with the first voltage signal, the third and fourth signal line SL3 and SL4 in combination provide equally to the even-numbered barrier electrodes EE with the second voltage signal, so that a deviation of the odd-numbered barrier electrodes OE and the even-numbered barrier electrodes EE may be decreased.

Figure 5A:
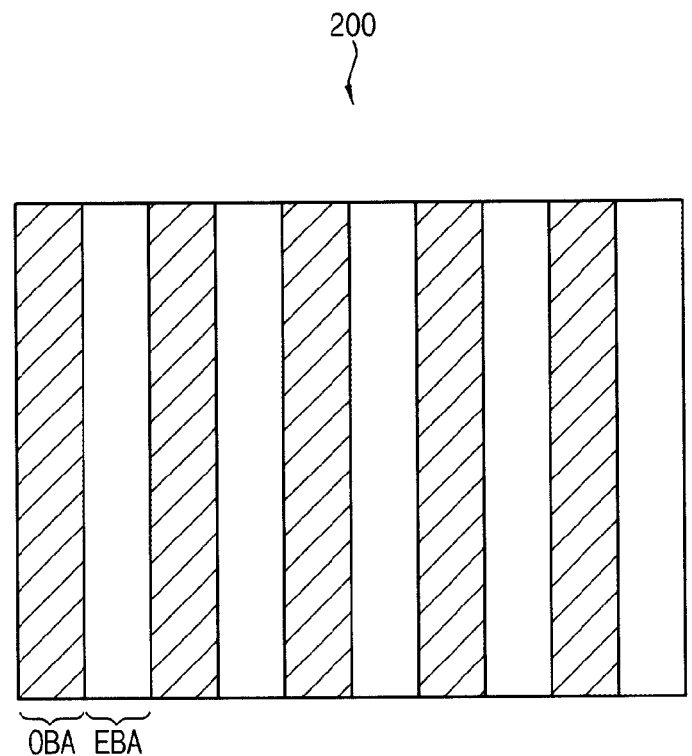
FIGS. 5A to 5C are plan views illustrating a barrier panel for describing modes of barrier panel of FIG. 3.
Figure 5B:
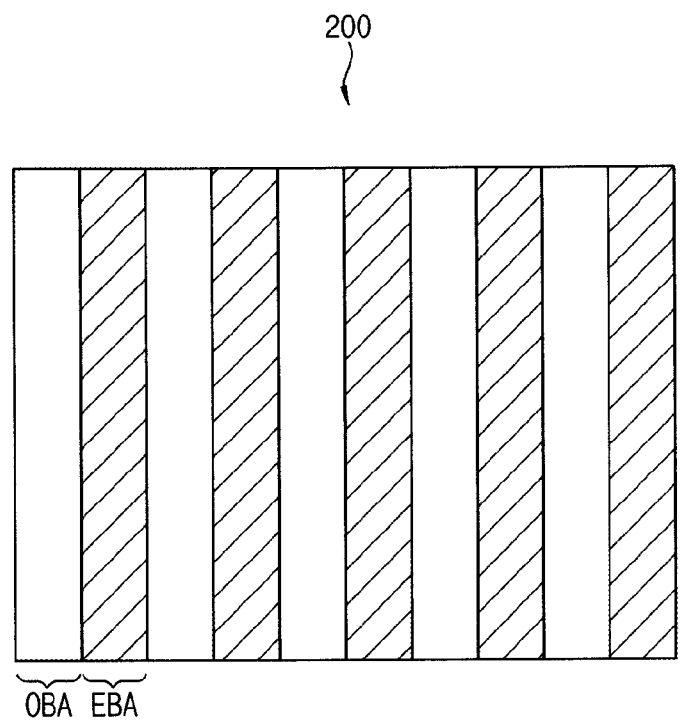
Figure 5C:
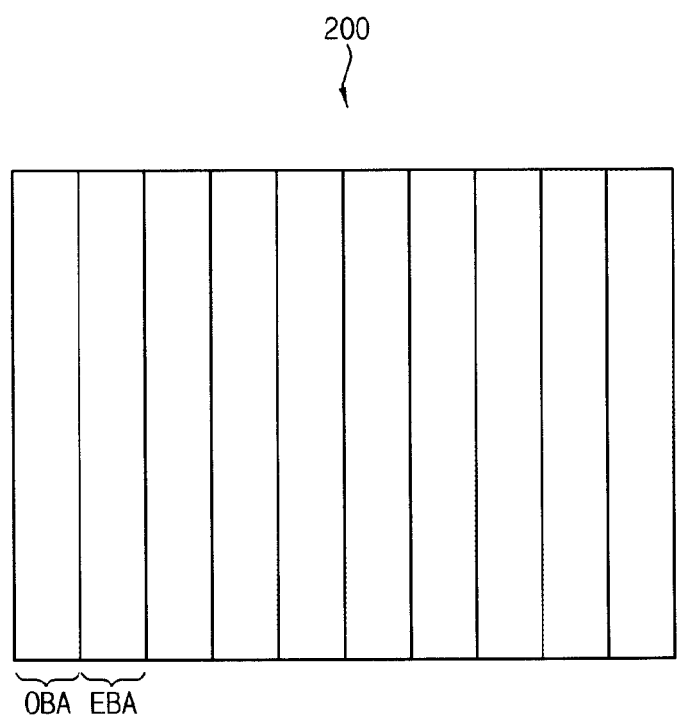

FIGS. 5A to 5C are plan views illustrating one way of operating a barrier panel such as that of FIG. 3.

FIG. 5A is a plan view illustrating a barrier panel in a first selective blocking mode for describing projection of a first eye (e.g., left-eye) 3-dimensional stereoscopic image mode.

Referring to FIGS. 3 and 5A, when the first voltage signal is provided to the odd-numbered barrier electrodes OE through the first and second signal line SL1 and SL2, due to a difference between the first voltage signal and a common voltage (Vcom) provided to the second common electrode CE, the liquid crystal molecules of the second liquid crystal layer 230 disposed between the odd-numbered barrier electrode OE and the second common electrode CE is arranged to be in black or light blocking condition. Therefore, a light passing through the odd-numbered barrier electrode OE is blocked.

On the other hand, when the second voltage signal is provided to the even-numbered barrier electrodes EE through the third and fourth signal line SL3 and SL4, due to a difference between the second voltage and a common voltage provided to the second common electrode CE, the liquid crystal molecules of the second liquid crystal layer 230 disposed between the even-numbered barrier electrode EE and the second common electrode CE are arranged in a white or light rays passing condition. Therefore, a light trying to pass through the even-numbered barrier electrodes EE is passed.

Therefore, an observer observing the display apparatus may see a 3-dimensional stereoscopic image passing an even barrier area EBA corresponded to the even-numbered barrier electrodes EE. The 3-dimensional stereoscopic image includes a first left eye image and a first right eye image, the first left eye image is provided to a left eye of an observer, the first right eye image is provided to a right eye of an observer. Due to a parallax between a left eye and right eye, the observer may perceive a 3-dimensional stereoscopic image. Because the barrier panel 200 blocks or reduced leakage light rays associated with the left or right eyed image that at the time is not to be projected, crosstalk between the left-eye and right-eye images is reduced.

FIG. 5B is a plan view illustrating a barrier panel for describing a second 3-dimensional stereoscopic image mode.

Referring to FIGS. 3 and 5B, when the first voltage signal is provided to the odd-numbered barrier electrodes OE through the first and second signal line SL1 and SL2, due to a difference between the first voltage and a common voltage provided to the second common electrode CE, liquid crystal molecules of the second liquid crystal layer 230 disposed between the odd-numbered barrier electrode OE and the second common electrode CE is arranged in the white condition. Therefore, a light trying to pass through the odd-numbered barrier electrode OE is passed.

On the other hand, when the second voltage signal is provided to the even-numbered barrier electrodes EE through the third and fourth signal line SL3 and SL4, due to a difference between the second voltage and a common voltage provided to the second common electrode CE, liquid crystal molecules of the second liquid crystal layer 230 disposed between the even-numbered barrier electrode EE and the second common electrode CE are arranged in the black condition. Therefore, leakage lights trying to pass through the even-numbered barrier electrodes EE are blocked.

Therefore, an observer observing the display apparatus may see a 3-dimensional stereoscopic image passing an odd barrier area OBA corresponded to the odd-numbered barrier electrodes OE. The 3-dimensional stereoscopic image includes a second left eye image and a second right eye image, the second left eye image is provided to a left eye of an observer, the second right eye image is provided to a right eye of an observer. Due to a parallax between a left eye and right eye, the observer may see a 3-dimensional stereoscopic image that is substantially free of crosstalk.

The first 3-dimensional stereoscopic image mode and the second 3-dimensional stereoscopic image mode are actuated in alternate time periods. For example, the first 3-dimensional stereoscopic image mode may be actuated during odd frames, the second 3-dimensional stereoscopic image mode may be actuated during even frames.

The first 3-dimensional stereoscopic image mode and the second 3-dimensional stereoscopic image mode may be high speed actuating at 240 Hz for example.

The odd-numbered barrier electrodes OE, the even-numbered barrier electrodes EE and the second common electrode may be actuated by way of AC signals. Therefore, power consumption may be decreased.

FIG. 5C is a plan view illustrating a barrier panel for describing a 2-dimensional display mode.

Referring to FIGS. 3 and 5C, when the barrier panel 200 is off, the barrier panel 200 displays a white condition. That is, a light passing the display panel 100 passes the odd barrier area OBA and even barrier area EBA of the barrier panel, so that an observer may see a 2-dimensional image provided by all the pixel columns of the display panel 100.

According to the present exemplary embodiment, a first signal line SL1 connected to a first end of the odd-numbered barrier electrodes OE and a second signal line SL2 connected to a second end of the odd-numbered barrier electrodes OE are provide a signal in opposite direction, so that a generation of a cross talk disparity may be decreased.

Figure 6:
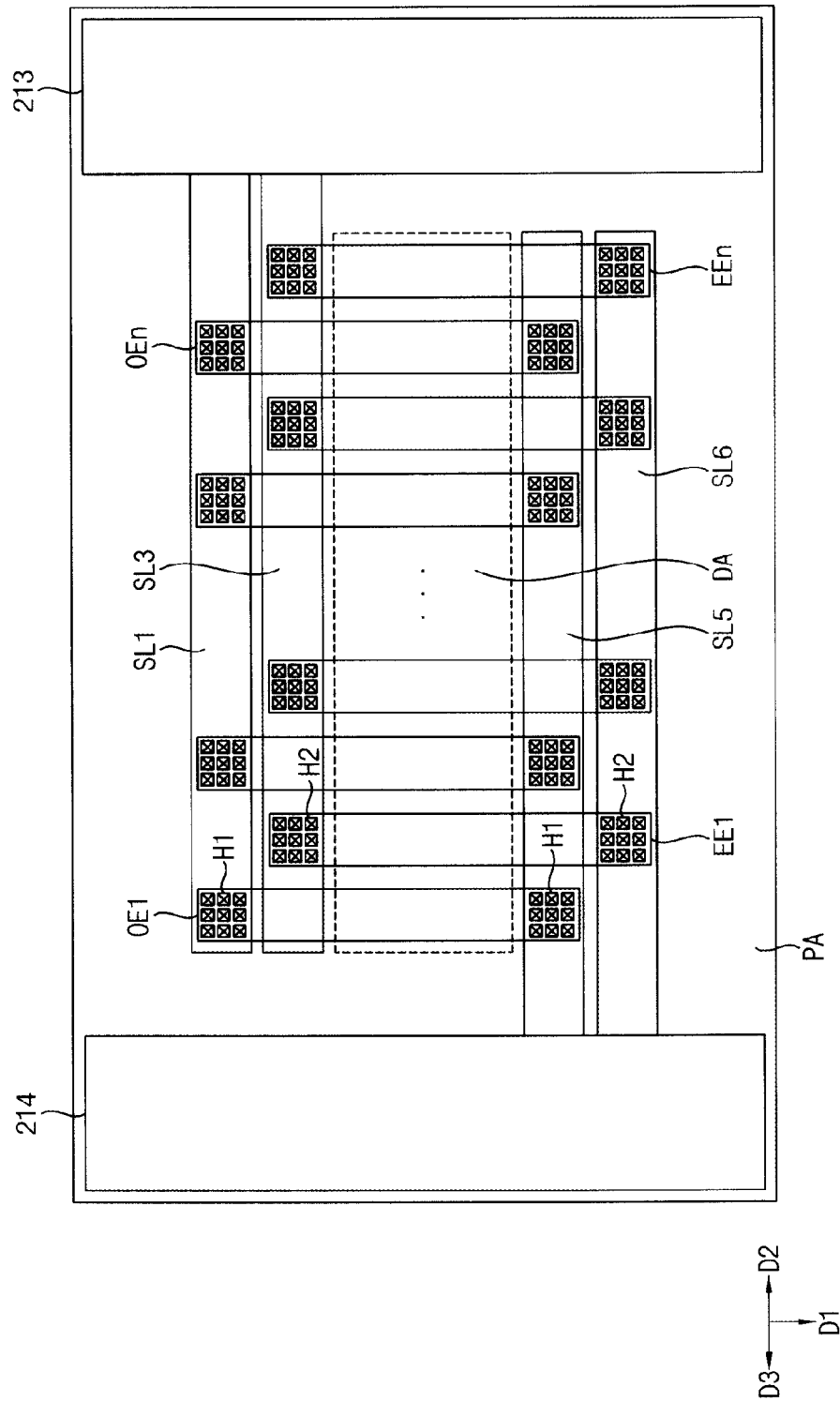
FIG. 6 is a plan view illustrating a first barrier substrate of a display apparatus according to another exemplary embodiment of the present disclosure.

FIG. 6 is a plan view illustrating a first barrier substrate of a display apparatus for display according to another exemplary embodiment of the present disclosure of invention. The concept here is substantially the same, in other words, each barrier electrode is supplied by way of both of its ends, with a combination of drive signals provided by way of a "long-path" route and by way of a "short-path" route so that disparity as to drive signal levels supplied to the differently located barrier electrodes and different segments along the length of each barrier electrode is eliminated or reduced.

Referring to FIG. 6, a first barrier substrate 210A of display apparatus includes a first base substrate 211, odd-numbered barrier electrodes OE, even-numbered barrier electrodes EE, an insulation layer LY, a first signal line SL1 having one end driven by a first barrier driving part 213, a second signal line SL5 having one end driven by a second barrier driving part 214, a third signal line SL3, and a fourth signal line SL6.

In one embodiment, the first and second driving parts 213 and 214 are integrally formed directly on the first base substrate 211. Alternatively, the first and second driving parts 213 and 214 are formed separately with the first base substrate 211, so that the first and second driving parts 213 and 214 may be mounted on the first base substrate 211.

The first signal line SL1 is substantially the same as the first signal line according to a exemplary embodiment in FIG. 1.

The first barrier driving part 213 connects to a first end of the first signal line SL1 and provides the first end of the first signal line SL1 with a first voltage signal. Therefore, the first voltage is provided to the odd-numbered barrier electrodes OE through the first signal line SL1.

The second signal line SL5 faces a third end adjacent to the first odd-numbered barrier electrode OE1 and a first end of the first signal line SL1 and includes a fourth end adjacent to the n-th odd-numbered barrier electrode OEn.

The second barrier driving part 214 connects to a third end of the second signal line SL5 and provides the third end of the second signal line SL5 with the first voltage signal. Therefore, the first voltage signal is provided to the odd-numbered barrier electrodes OE through the second signal line SL5.

The first signal line SL1 provides the first end of the odd-numbered barrier electrodes OE with the first voltage signal in a third direction D3, a third direction D3 is opposite to the second direction D2, and the second signal line SL5 provides the second end of the odd-numbered barrier electrodes OE with the first voltage signal in the second direction D2, so that a voltage of the first voltage is compensated. Therefore, the first voltage may be substantially equally provided to the odd-numbered barrier electrodes OE. Stated otherwise, in one embodiment, each barrier electrode is supplied by way of both of its ends, with a combination of drive signals provided by way of a relatively "long-path" route and by way of a relatively "short-path" route from barrier driving parts (214, 213) disposed at opposed ends of the display area DA so that disparity as to drive signal levels supplied to the differently located barrier electrodes and different segments along the length of each barrier electrode is eliminated or reduced.

The third signal line SL3 is substantially same as the third signal line according to a exemplary embodiment in FIG. 1.

The first barrier driving part 213 connects to a seventh end of the third signal line SL3 and provides the seventh end of the third signal line SL3 with a second voltage signal. Therefore, the second voltage signal is provided to the even-numbered barrier electrodes EE through the third signal line SL3.

The fourth signal line SL6 faces a ninth end adjacent to the first even-numbered barrier electrode EE1 and a ninth end of the fourth signal line SL6 and includes a tenth end adjacent to the n-th even-numbered barrier electrode EEn.

The second barrier driving part 214 connects to a ninth end of the fourth signal line SL6 and provides the ninth end of the fourth signal line SL6 with the second voltage signal. Therefore, the second voltage signal is provided to the even-numbered barrier electrodes EE through the fourth signal line SL6.

The third signal line SL3 provides the first end of the even-numbered barrier electrodes EE with the second voltage signal in a third direction D3, a third direction D3 is opposite to the second direction D2, and the fourth signal line SL6 provides the second end of the even-numbered barrier electrodes OE with the second voltage signal in the second direction D2, so that a voltage of the second voltage signal is compensated to be essentially the same level irrespective of where in the display area DA, the barrier electrode is located. Therefore, the second voltage signal may be substantially equally provided to the even-numbered barrier electrodes EE.

According to the present exemplary embodiment, the first barrier driving part 213 is disposed adjacent to the n-th odd-numbered barrier electrode OEn or the n-th even-numbered barrier electrode EEn, the second barrier driving part 214 is disposed adjacent to the first odd-numbered barrier electrode OE1 or the first even-numbered barrier electrode EE1, so that a length of the second and fourth signal lines SL2A and SL4A may be decreased.

According to the present disclosure of invention, a first signal line connects to one end of the odd-numbered barrier electrodes and a second signal line connects to an opposed other end of the odd-numbered barrier electrodes so as to thereby provide a drive signal in opposite directions, so that a generation of a crosstalk disparity between upper and lower parts of the odd-numbered barrier electrodes may be decreased.

Also, a third signal line connects to one end of the even-numbered barrier electrodes and a fourth signal line connects to another end of the even-numbered barrier electrodes so as to thereby provide a drive signal in opposite directions from opposite ends of the odd-numbered barrier electrodes, so that a generation of a crosstalk disparity between upper and lower parts of the odd-numbered barrier electrodes may be decreased.

Therefore, a generation of a crosstalk disparity may be decreased substantially across the whole of the display area DA.

Also, a low permittivity sealing member is overlapped with the second signal lines, so that RC delay of the second signal lines may be decreased. And the sealing member is overlapped with the fourth signal line, so that RC delay of the fourth signal line may be decreased.

Therefore, a quality of display apparatus for display a stereoscopic image is improved.

What is claimed is:

1. A barrier substrate comprising:
   a base substrate;
   odd-numbered barrier electrodes and even-numbered barrier electrodes longitudinally extended in a first direction on the base substrate and arranged as interdigitated with one another along a second direction, the second direction being different from the first direction;
   a first signal line electrically connected to one end of the odd-numbered barrier electrodes and configured to transmit a first signal in the second direction;
   a second signal line electrically connected to an opposed other end of the odd-numbered barrier electrodes and configured to transmit the first signal in a third direction, the third direction being opposite to the second direction;
   a third signal line electrically connected to one end of the even-numbered barrier electrodes and configured to transmit a second signal in the second direction, the second signal being different from the first signal; and
   a fourth signal line electrically connected to an opposed other end of the even-numbered barrier electrodes and configured to transmit the second signal in the third direction, and
   wherein the second signal line comprises:
      a first sub-electrode including a third end disposed adjacent to the first odd-numbered barrier electrode of the barrier electrodes and a fourth end disposed adjacent to the n-th odd-numbered barrier electrode of the odd-numbered barrier electrodes;
      a second sub-electrode in substantially parallel with the first sub-electrode and including a fifth end facing the third end and a sixth end facing the fourth end; and
      a third sub-electrode connecting the third end to the fifth end.

2. The barrier substrate of claim 1, wherein the even-numbered barrier electrodes are positionally staggered in the first direction relative to the odd-numbered barrier electrodes.

3. The barrier substrate of claim 1, wherein portions of the odd-numbered barrier electrodes are overlapped with the first, second and fourth signal lines but not with the third signal line, and wherein portions of the even-numbered barrier electrodes are overlapped with the second, third and fourth signal lines but not with the first signal line.

4. The barrier substrate of claim 1, the odd-numbered barrier electrodes are electrically connected to the first and second signal lines through a plurality of first contact holes, and the even-numbered barrier electrodes are electrically connected to the third and fourth signal lines through a plurality of second contact holes.

5. The barrier substrate of claim 1,
   wherein the first signal line comprises:
      a first end disposed adjacent to a first odd-numbered barrier electrode of the odd-numbered barrier electrodes; and
      a second end disposed adjacent to an n-th odd-numbered barrier electrode of the odd-numbered barrier electrodes.

6. The barrier substrate of claim 5,
   wherein the third signal line comprises:
      a seventh end disposed adjacent to a first even-numbered barrier electrode of the even-numbered barrier electrodes; and
      a eighth end disposed adjacent to an n-th even-numbered barrier electrode of the odd-numbered barrier electrodes, and
   wherein the fourth signal line comprises:
      a fourth sub-electrode including a ninth end disposed adjacent to the first odd-numbered barrier electrode of the odd-numbered barrier electrodes and a tenth end disposed adjacent to the n-th odd-numbered barrier electrode of the odd-numbered barrier electrodes;
      a fifth sub-electrode substantially in parallel with the first sub-electrode and including a eleventh end facing with the ninth end and a twelfth end facing with the tenth end; and
      a sixth sub-electrode connecting the ninth end and the twelfth end.

7. The barrier substrate of claim 6, wherein the barrier substrate further comprises a barrier driving part that connects to the second end and to the sixth end and is configured to apply the first signal to the second and sixth ends and connects to the ninth end and to the twelfth end and is configured to apply the second signal to the ninth and twelfth ends.

8. The barrier substrate of claim 6, wherein the barrier substrate further comprises a sealing member that is overlapped with the second, third, fifth and sixth sub-electrodes.

9. The barrier substrate of claim 6, wherein the first signal line is disposed between the fourth sub-electrode and the fifth sub-electrode, and the third signal line is disposed between the first sub-electrode and the second sub-electrode.

10. The barrier substrate of claim 1, wherein
    the first signal line comprises the first end disposed adjacent to the first odd-numbered barrier electrode of the odd-numbered barrier electrodes and the second end disposed adjacent to the n-th odd-numbered barrier electrode of the odd-numbered barrier electrodes,
    the second signal line comprises the third end disposed adjacent to the first odd-numbered barrier electrode of the barrier electrodes and the fourth end disposed adjacent to the n-th odd-numbered barrier electrode of the odd-numbered barrier electrodes,
    the third signal line comprises the seventh end disposed adjacent to the first even-numbered barrier electrode of the even-numbered barrier electrodes and the eighth end disposed adjacent to the n-th even-numbered barrier electrode of the even-numbered barrier electrodes, and
    the fourth signal line comprises the ninth end disposed adjacent to the first odd-numbered barrier electrode of the barrier electrodes and the tenth end disposed adjacent to the n-th odd-numbered barrier electrode of the odd-numbered barrier electrodes.

11. The barrier substrate of claim 10, wherein the barrier substrate further comprises:
a first barrier driving part connected to the second end and configured to apply the first signal to the second end and connected to the eighth end and configured to apply the second signal to the eighth end; and
a second barrier driving part connected to the sixth end and configured to apply the first signal to the sixth end and connected to the twelfth end and configured to apply the second signal to the twelfth end.

12. The barrier substrate of claim 1, wherein the odd and even-numbered barrier electrodes comprise a transparent conductive material, and
the first, second, third and fourth signal line comprise at least one member selected from the group consisting of copper, aluminum and an alloy thereof.

13. A barrier panel comprising:
a first barrier substrate comprising:
a base substrate;
odd-numbered barrier electrodes and even-numbered barrier electrodes extended along a first direction on the first base substrate, and arranged adjacent to one another along a second direction, the second direction being different from the first direction;
a first signal line electrically connected to corresponding first ends of the odd-numbered barrier electrodes and configured to transmit a first signal to the odd-numbered barrier electrodes by way of the corresponding first ends thereof, the transmitted first signal arriving at the corresponding first ends along the second direction;
a second signal line electrically connected to corresponding second ends of the odd-numbered barrier electrodes and configured to transmit the first signal to the odd-numbered barrier electrodes by way of the corresponding second ends thereof along a third direction, the third direction being opposite to the second direction;
a third signal line electrically connected to corresponding third ends of the even-numbered barrier electrodes and configured to transmit a second signal to the even-numbered barrier electrodes by way of the corresponding third ends thereof, the transmitted second signal arriving at the corresponding third ends along the second direction, the second signal being different from the first signal; and
a fourth signal line electrically connected to corresponding fourth ends of the even-numbered barrier electrodes and configured to transmit the second signal to the even-numbered barrier electrodes by way of the corresponding fourth ends thereof along the third direction;
a second barrier substrate facing the first barrier substrate and comprising a base substrate and a common electrode disposed on the base substrate; and
a liquid crystal layer disposed between the first barrier substrate and the second barrier substrate, and
wherein the odd-numbered barrier electrodes are overlapped with the first, second and fourth signal lines but not with the third signal line, and the even-numbered barrier electrodes are overlapped with the second, third and fourth signal lines but not with the first signal line.

14. The barrier panel of claim 13, wherein the even-numbered barrier electrodes are positionally staggered in the first direction with respect to the odd-numbered barrier electrodes.

15. The barrier panel of claim 13, wherein the first barrier substrate further comprises a sealing member, the second signal line has first, second and third sub-electrodes, the fourth signal line has fourth, fifth and sixth sub-electrodes, and the sealing member is overlapped with the second, third, fifth and sixth sub-electrodes.

16. The barrier panel of claim 15, wherein the sealing member has a lower dielectric permittivity than that of the liquid crystal layer.

17. A display apparatus comprising:
a display panel configured for displaying an image; and
a barrier panel disposed on the display panel, the barrier panel comprising:
a first barrier substrate comprising:
a base substrate;
odd-numbered barrier electrodes and even-numbered barrier electrodes extended along a first direction on the first base substrate, and arranged adjacent to one another along a second direction, the second direction being different from the first direction;
a first signal line electrically connected to corresponding first ends of the odd-numbered barrier electrodes and configured to transmit a first signal to the odd-numbered barrier electrodes by way of the corresponding first ends thereof, the transmitted first signal arriving at the corresponding first ends along the second direction;
a second signal line electrically connected to corresponding second ends of the odd-numbered barrier electrodes and configured to transmit the first signal to the odd-numbered barrier electrodes by way of the corresponding second ends thereof along a third direction, the third direction being opposite to the second direction;
a third signal line electrically connected to corresponding third ends of the even-numbered barrier electrodes and configured to transmit a second signal to the even-numbered barrier electrodes by way of the corresponding third ends thereof, the transmitted second signal arriving at the corresponding third ends along the second direction, the second signal being different from the first signal; and
a fourth signal line electrically connected to corresponding fourth ends of the even-numbered barrier electrodes and configured to transmit the second signal to the even-numbered barrier electrodes by way of the corresponding fourth ends thereof along the third direction;
a second barrier substrate facing the first barrier substrate and comprising a base substrate and a common electrode disposed on the base substrate; and
a liquid crystal layer disposed between the first barrier substrate and the second barrier substrate, and
wherein the odd-numbered barrier electrodes correspond to respective ones a plural pixel electrodes arranged in the first direction.

18. The display apparatus of claim 17, wherein the display panel comprises a gate line, a data line, a switching element electrically connected to the gate line and the data line and a pixel electrode electrically connected to the switching element, and
the first, second, third and fourth signal lines comprise substantially the same material as used in at least one of the gate line and the data line.

* * * * *